United States Patent [19]

Underberg

[11] Patent Number: 5,208,438
[45] Date of Patent: May 4, 1993

[54] METHOD AND APPARATUS FOR ADJUSTING LASER INSTRUMENTS Z AXIS

[75] Inventor: Robert L. Underberg, Meguon, Wis.

[73] Assignee: David White, Inc., Germantown, Wis.

[21] Appl. No.: 716,245

[22] Filed: Jun. 17, 1991

[51] Int. Cl.$^5$ ............................................. B23K 26/02
[52] U.S. Cl. ................................. 219/121.78; 250/205
[58] Field of Search ........... 219/121.6, 121.78, 121.83, 219/121.85; 250/205

[56] References Cited

U.S. PATENT DOCUMENTS 4,062,634 12/1977 Rando et al. ..................... 356/248
4,221,483 9/1980 Rando ............................... 356/250

Primary Examiner—C. L. Albritton
Attorney, Agent, or Firm—Michael, Best & Friedrich

[57] ABSTRACT

A fixture for use in adjusting a laser type leveling instrument has a cradle mounted on a base and operative to support the instrument with its normally vertical axis disposed horizontally. A pentaprism is mounted on a rotable platform on the base to reflect a laser beam, emitted by an instrument in the cradle and impinging on the pentaprism, in a horizontal path. The rotatable platform for the pentaprism permits movement of the pentaprism from a first position in which the beam is directed forwardly and a second position in which the beam is reversed and reflected rearwardly.

8 Claims, 3 Drawing Sheets

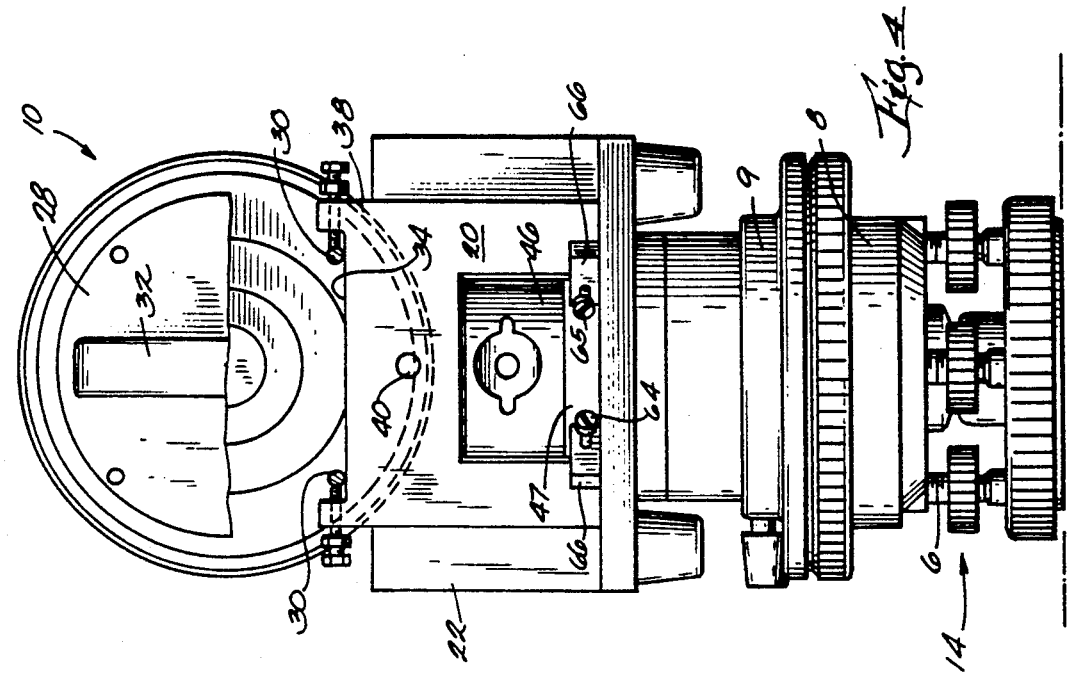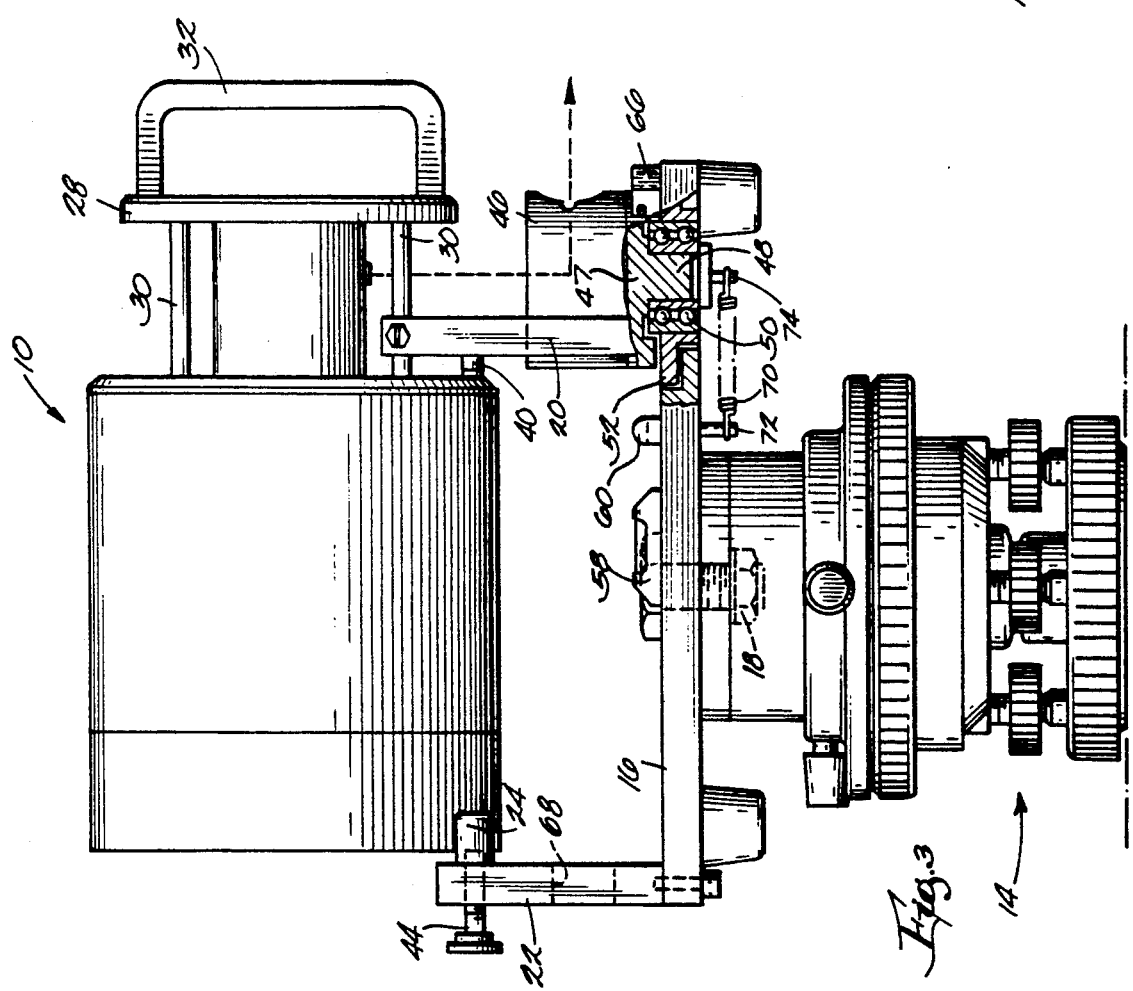

METHOD AND APPARATUS FOR ADJUSTING LASER INSTRUMENTS Z AXIS

BACKGROUND OF THE INVENTION

Laser leveling instruments sweep a horizontal beam over the area. The instrument is adjusted by projecting the beam at a target located at least 10 meters away, preferably more since accuracy of the adjustment increases with distance to the target. It is convenient to reflect the beam back towards the vicinity of the instrument since it is easier for the technician to make readings, etc.

In the normal operating mode a laser leveling instrument is leveled in the X and Y axes and is used principally in that mode. When the instrument is used to establish a vertical plane (Z axis) it is tipped on its side so the (normally horizontal) beam will sweep in a vertical plane. The Z axis must be adjusted initially to a plane normal to the earth's surface. Normally the instruments are calibrated/adjusted in rooms having 3-4 meter ceilings which does not give enough room the locate a target far enough above the instrument to permit accurate adjustment.

This invention is directed to apparatus for enabling adjustment of the Z axis in laser instruments while using a target preferably located 10 or more meters from the instrument. A new adjustment method is used and takes less time than prior methods while giving excellent results.

SUMMARY OF THE INVENTION

This invention provides a fixture in which a self leveling laser level is supported while adjusting the Z axis sensor of the instrument. The fixture is mounted on a tripod head or the like which can be accurately leveled to provide a reference datum. The fixture is leveled on the tripod head and includes a pentaprism which is accurately adjusted to reflect horizontally a laser beam from the instrument supported in the fixture with its normally vertical axis in a horizontal position so the laser beam, which now sweeps a vertical plane, will be reflected horizontally by the pentaprism. The horizontal beam reflected by the pentaprism can be projected a considerable horizontal distance and may be reflected back by a mirror with a long distance to the target it is possible to accurately adjust the Z axis (leveling vial) without requiring 10 meter ceilings.

An important feature of this invention is mounting the prism on a rotatable platform so it can be made to reflect the beam rearwardly (reverse) as well as forwardly (direct). This enables the adjustment to remove pure slope errors (any cone errors will not affect the adjustment).

Another important feature of this invention is the use of a pentaprism instead of a mirror to cancel out errors introduced when the laser beam is reflected off only one surface (as with a mirror).

Another object of this invention is to provide a novel method for adjusting the Z axis of a laser type leveling instrument. The method is faster and more efficient than the methods used in the past.

BRIEF DESCRIPTION OF THE DRAWINGS

FIG. 3 is a side elevation view of the instrument in the fixture.

FIG. 4 is an elevation taken from the right in FIG. 3.

DETAILED DESCRIPTION OF THE DRAWINGS

Figure 1:
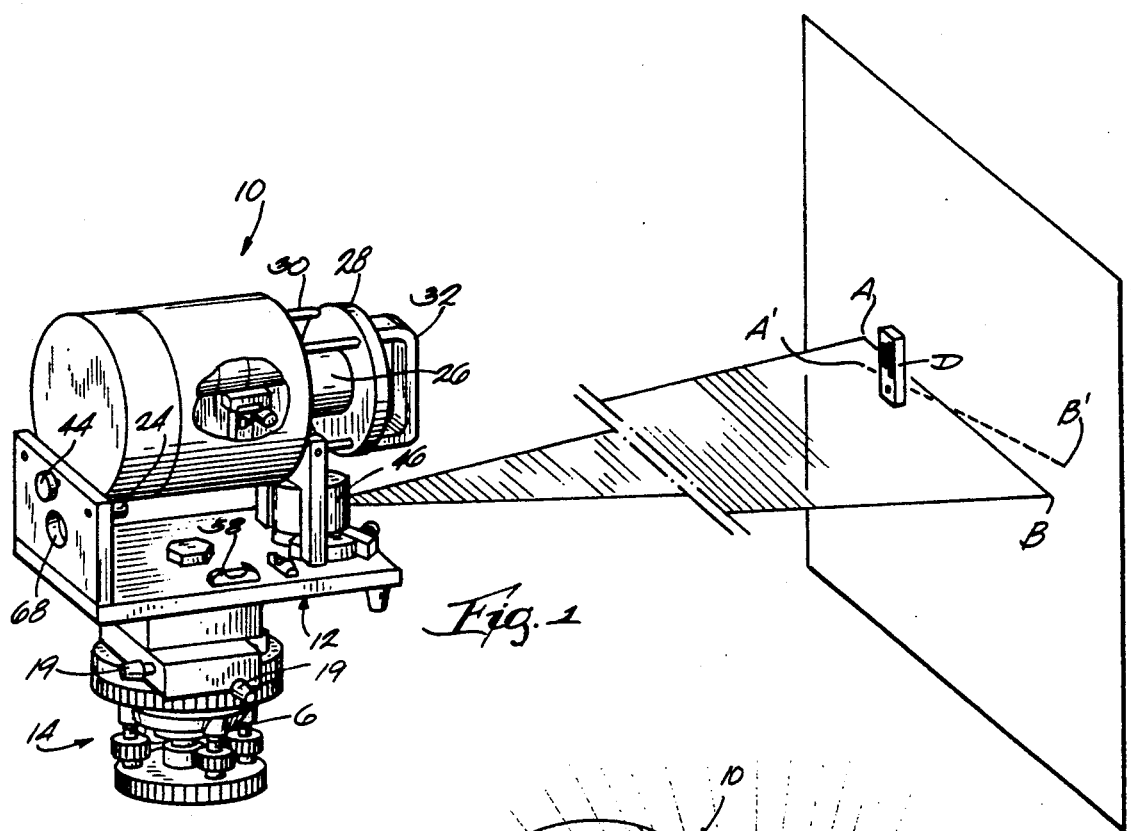
FIG. 1 is a perspective view of a self leveling laser instrument supported in the present adjusting fixture for adjusting the Z axis of the instrument by projecting the "vertical" laser beam horizontally to a target located a considerable distance from the fixture.
Figure 2:
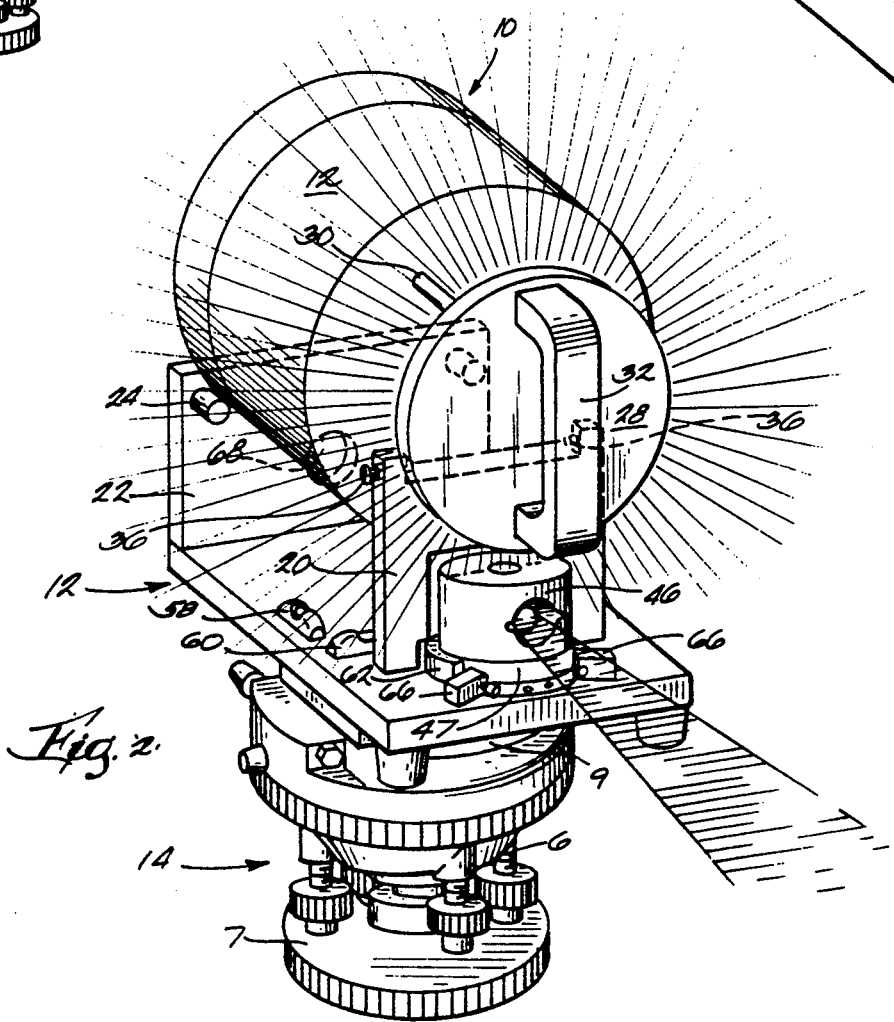
FIG. 2 is another perspective view of the instrument and cradle.
Figure 6:
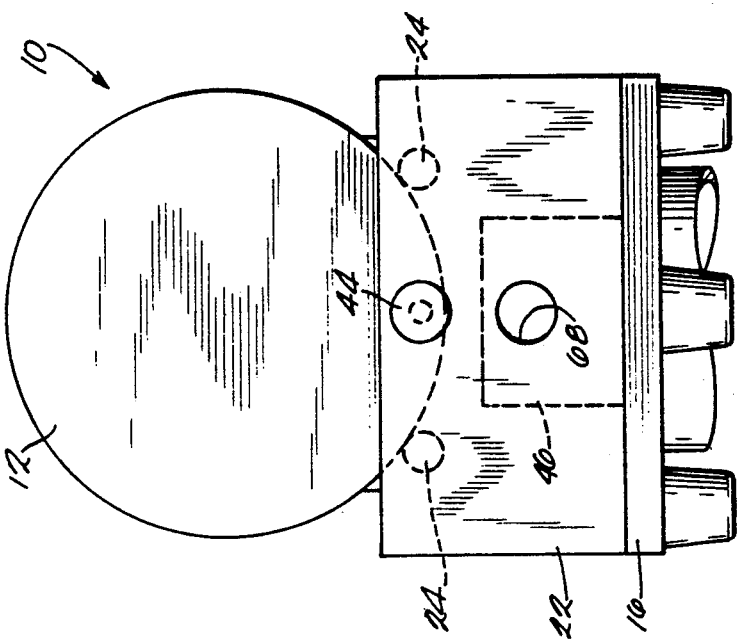
FIG. 6 is an elevation from the left in FIG. 3.
Figure 5:
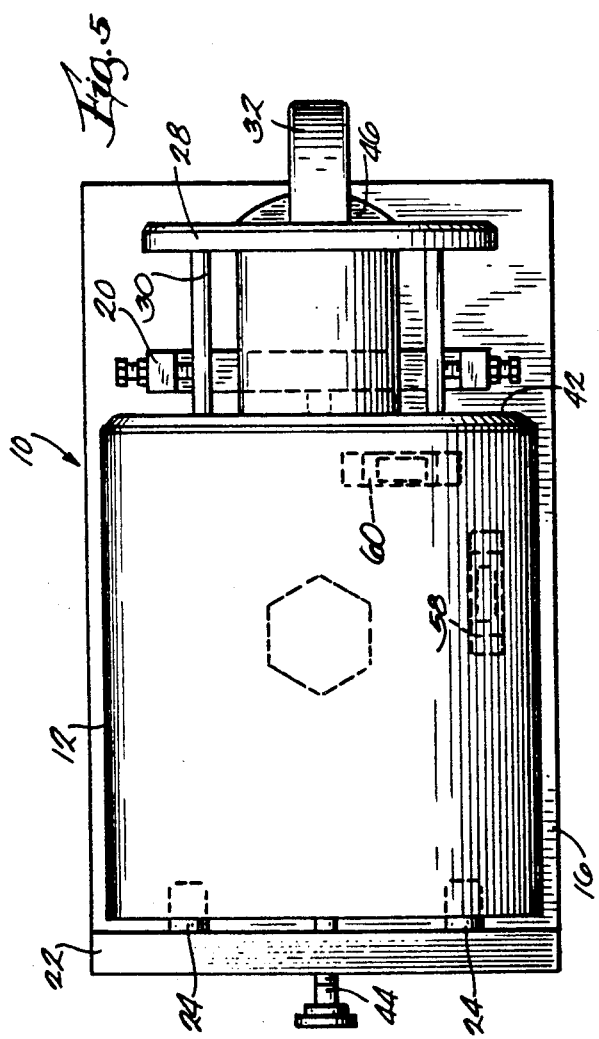
FIG. 5 is a top view of the instrument resting in the fixture.
Figure 7:
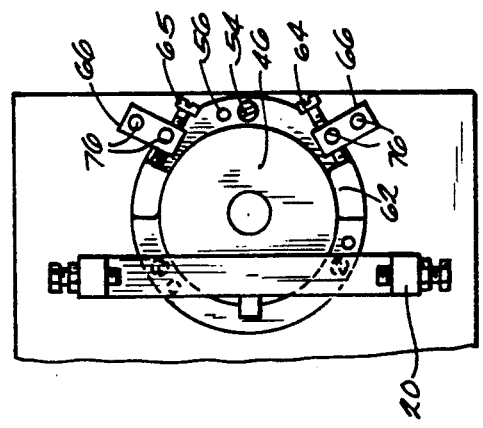
FIG. 7 is an enlarged detailed plan view of the pentaprism mount which can reflect the laser beam in either of two opposite directions.

To put this invention in perspective it should be noted that the details of the self leveling laser instrument are not critical and this invention can be used to adjust instruments having various construction details. This invention provides an apparatus, hereinafter referred to as a fixture in which the instrument is cradled while adjustments are made to the Z axis calibration. The fixture provides means for holding the instrument with its normally vertical axis in a nearly horizontal position so adjustments can be made to the Z axis level vial.

Before the instrument 10 is mounted in the fixture 12 the X and Y level vials in the instrument are adjusted in the usual manner. This is carried out with the center part 12 of the protective housing removed to expose the adjusting means for the electronic level sensing devices (vials) which are adjustably mounted to the gimbaled portion of the internal mechanism. For clarity and to keep the drawings simple the cover 12 is shown in place with a portion cutout to show the interior (the details of which are unimportant here)... if the cover was removed a lot of detailed, irrelevant parts would be exposed without adding anything of value to this disclosure.

There are three level vials (X,Y,Z) orthogonally arranged of the mechanism of the instrument. When the instrument is used in the vertical mode only the Z axis vial is active. Initially the instrument is adjusted on a different fixture which provides a truly horizontal surface and the X and Y axis vials are adjusted. Each vial assembly is mounted on the gimbaled portion of the instrument with two screws passing through oversize holes in the vial assembly into tapped holes in the gimbaled assembly. Midway between the mounting holes and in line with them there is a dowel pin which serves as a pivot for the vial adjustment. Perpendicular to each of the two mounting screws and in line with them are adjusting screws which impinge on the body of the mounting screw and are used as fine adjustments to pivot the vial assembly within the clearance of the oversize holes. In use of the instrument tilting the vial assembly causes an electrical signal to be sent to an electric motor which, in turn, drives the gimbaled assembly via a cam arrangement in the direction to null out the signal from the vial assembly. The vial is adjusted by means of the vial adjusting screws until the gimbaled assembly is positioned to produce a horizontal laser sweep when the instrument is in the fixture. These adjustments are made with the cover removed. After the adjustments have been completed the cover is replaced. This makes the instrument more rigid and likely results in changing the vial adjustments slightly. The instrument is then fine tuned...i.e., electric potentiometers accessible from outside the instrument are adjusted to change the electrical bias on each of the vials.

The fixture 12 is mounted on a leveling support or tripod head 14 which has four leveling screws 6 acting between the base 7 and the plate 8, gimbaled in the base, on which the rotating platform 9 is mounted. Opposite pairs of screws are used to level in the X and Y directions and can be adjusted to level the bed or base 16 of fixture 12 which is secured to platform 9 by means of nut 18. The base 16 is preferably pinned to the leveling support by means of a roll pin not shown or the like offset from the nut 18 to prevent rotation and to align the cradle assembly 20, 22 convenient to the clamp and tangent knobs 19 mounted in the plate 9. The two leveling vials 58, 60 mounted on the base at 90° to each other are set in alignment to the adjustment axes of the leveling screws via the rotating platform 9. The leveling vials are preferably adjusted using the well known in the art "half half" method. This assures that the bubbles will remain centered at all angular positions of the rotating platform 9. When the bed or base 16 of the fixture 12 is leveled within the indication provided by the two vials 58, 60 an instrument in the fixture is known to be reasonably centered relative to its self leveling range.

The laser instrument is supported on cradle means including front and rear cradles 20, 22, respectively, mounted on the bed. The rear cradle 22 has spaced, forwardly facing support pins 24, 24 upon which the base of the instrument rests. The instrument has a rotating laser-emitting cylindrical cover 26 at its top. As this rotates, the laser beam sweeps in a plane perpendicular to the axis of the instrument. A top plate 28 is connected to the lower portion of the instrument by four ronds 30 and has a carrying handle 32 mounted thereon. Two of these rods 30 rest on the horizontal portion 34 of the front cradle 20 between the adjusting screws 36 in the upright corners 38 of the cradle. The screws 36 bear against the rods to center the instrument and its laser on the cradle with the bottom of the instrument centered on pins 24 and parallel to the rear cradle. After the adjustment has been made the screws 36 are backed off slightly and left in that position.

A central adjusting screw 40 projects rearwardly from the front cradle to bear against the surface 42 on the instrument to serve as a reference point against which the adjusting screw 44 in the top center of the rear cradle pushes the instrument to place it in a definite location with the laser beam sweeping a plane impinging of the pentaprism in a mounting means that includes a vertical axis. Thus, the mounting means housing 46 has a housing platform 47 on which the pentaprism is mounted and which has a depending stub shaft 48 on which the inside race of bearing 50 is mounted. The outside race is fixed in plate 52 which is connected to the bed 16 of the fixture by three pairs of push-pull mounting screws 54, 56 which can be adjusted by the "half half" method to precisely level the pentaprism (i.e. compensate for any errors introduced by the bearing 50). This adjustment is done after the bed has been leveled using the two levels 58, 60 and the four screws in the leveling support. Temporarily, an adjustable vial is mounted to the pentaprism housing 46 when using the push-pull screws to level the pentaprism.

The pentaprism housing or mounting means 46 permits an adjustment of the reflecting pentaprism by being provided with a projecting segment 62 which abuts either of two alignment stop screw 64, 65 threaded through blocks 66 to determine the position of the pentaprism i.e. whether it will project forwardly (as shown) or rearwardly through the hole 68 in the rear support. These screws 64, 65 also help in alignment of the pentaprism with respect to the laser beam as will appear hereafter.

The pentaprism housing 46 is biased to either of those positions by spring 70 tensioned between fixed post 72 and post 74 depending from the pentaprism housing 46 so as to lie either side of a line connecting the post 72 and the center of the prism housing to obtain a toggle action biasing the prism to either position. Three short feet are mounted on the underside of the bed to support the fixture when it is off the leveling base 14.

To adjust the fixture (for later use in adjusting instruments) a laser instrument is first adjusted for X and Y level and cone before using the Z axis fixture. Also the laser instrument must be standarized before setting it in the cradle. Standardizing is done by setting the laser instrument on a truly level surface and allowing the instrument to self level...The laser is then turned off while moving it from the level plate to the fixture. When the instrument is used in its Z axis mode its Y axis leveling motor is disabled and the X axis leveling motor is controlled by the Z axis level sensor. Placing the "standardized" laser into the fixture in its "off" condition before turning it on will not disturb the Y axis position. The instrument is then pushed forward to the stop pin 40 by means of the clamp screw 44 but the screw is not tightened. The axis of the leveling support 14 is used to aim the horizontal sweep from the pentaprism to the target area. The sweep is about 5 deg. wide (1 meter at 10 meters). If the beam was visible and if the fixture was in adjustment the sweep on the target would appear like line AB in FIG. 1 with both ends having the same elevation. More likely, the unadjusted beam will produce a sloping line on the target like A'B', for example. A detector D may be used to precisely locate the line of the laser beam.

If, as shown in FIG. 1, the end B is higher than A the prism alignment/stop screw 64 is turned counter clockwise to lower end B (turning clockwise would raise end B). This adjustment is actually changing the orientation of the pentaprism surfaces relative to the laser beam to ensure alignment of the reflecting surfaces of the pentaprism relative to the beam. The fixture is adjusted until all points on the sweep have the same elevation. The adjustment is then fixed by means of the locking screws 76. Now the pentaprism is reversed to project the sweep through the hole 68 in the rear cradle and the other pentaprism alignment screw 65 becomes active. After the beam sweep is redirected down range, the adjustment procedure is repeated but with the effect of turning screw 65 reversed from screw 64. The adjustment is repeated until the ends of the sweep are at the same elevation in both the forward mode and reverse mode. The fixture is now adjusted and ready for use in adjusting the Z axis of other instruments into desired final alignment by either or two procedures.

Prior to using either procedure the instrument is adjusted for X and Y axes in other, standard procedures. Then the instrument is placed in the fixture. The following uses the terms direct and reverse readings. Direct readings are those taken with the pentaprism reflecting the laser beam forward as in FIG. 1. Reverse readings are those taken with the beam reflected to the rear through the hole in the rear cradle. The center of the beam in both cases is directed down range to the detector. It is most convenient to use a mirror to double the length of the range and to display the beam close to the instrument being adjusted. In this method the mirror need not be exactly vertical and can be set to reflect the beam to a convenient spot. In either case the Z axis is in adjustment when the elevations of the direct and reverse readings are the same. This method will remove pure slope errors and any cone errors will not affect the adjustment.

Another method is generally used with established test stands and is probably more accurate. The laser beam sweep is directed to a pair of detectors, one near and one far. The relative heights of the two intercepts are accurately displayed on a monitor at the test stand. The difference between the two elevations divided by the distance between the two detectors is the slope of the beam in that direction. This slope is the algebraic sum of the tilt and cone. Reversing the fixture will give the opposite slope and enough data to isolate the tilt from the slope.

I claim:

1. Apparatus in which self leveling laser beam emitting instruments of the type that have X and Y axes and a normally vertical Z axis can be supported for adjustment of said Z axis into a desired final alignment, said apparatus comprising, a base, cradle means mounted on said base and operative to support a self leveling laser instrument with its normally vertical Z axis disposed horizontally to cause vertical emission of its laser beam, mounting means mounted on said base, reflecting means mounted on said mounting means in position for a laser beam emitted by an instrument placed in said cradle means to impinge on the reflecting means and reflected in a horizontal path, said mounting means including a means permitting adjustment of said reflecting means reflective to said base to a fixed reference position wherein the sweep of a standardized reference instrument laser beam is level thus indicating that the reflecting means is set at a proper position of adjustment enabling subsequent use of the apparatus to adjust the Z axis of any self-leveling laser instruments placed thereon into desired final alignment.

2. Apparatus according to claim 1 wherein said mounting means includes a rotatable platform mounted on said base, said reflecting means being mounted on said platform for movement between a first position in which said beam is directed forwardly and a second position in which said beam is reversed and reflected rearwardly.

3. Apparatus according to claim 2 in which said reflecting means is a pentaprism.

4. Apparatus according to claim 3 having first and second stop means positioned adjacent said platform to engage said platform in said first and said second positions, respectively, means biasing said platform to either of said positions, and including adjusting means for each of said stop means to precisely position said pentaprism relative to the laser beam emitted from the standardized instrument to enable accurate Z axis adjustment of self leveling laser instruments subsequently placed in said cradle means.

5. Apparatus according to claim 4 including a leveling support for said base, said support including four leveling screws arranged in opposed pairs at right angles to each other for leveling the base in X and Y axes, and level vials mounted on said base at right angles to each other to indicate level in the X and Y axes.

6. A method for adjusting the Z axis of a laser type leveling instrument, comprising, placing the instrument into a fixture having a cradle supporting the instrument so its normally vertical axis is horizontal, directing the laser beam in a vertical plane inpinging upon a pentaprism mounted in the fixture so the beam is reflected in a horizontal plane by the pentaprism.

7. The method of claim 6 including the step of rotating said pentaprism about its axis so said beam is reflected in the opposite direction.

8. The method of claim 7 including biasing said prism against a stop in either of the two positions of said prism, and adjusting the precise position of each stop to accurately position the prism relative to the beam.

* * * * *

UNITED STATES PATENT AND TRADEMARK OFFICE
CERTIFICATE OF CORRECTION

PATENT NO.   :   5,208,438
DATED        :   May 4, 1993
INVENTOR(S)  :   Robert L. Underberg It is certified that error appears in the above—identified patent and that said Letters Patent is hereby corrected as shown below:

Column 3, line 49, after "includes" insert:

--a housing 46 on the front of the bed of the fixture.

The pentaprism in housing or turret 46 is secured to the fixture bed by means allowing rotation of the prism about--

Column 3, line 67, "alignment stop" should be
   --alignment/stop--.

Column 4, line 10, "prism" should be --pentaprism-- and after "housing" and before "to" insert --46--.

Column 4, line 11, "prism" should be --pentaprism--.

Signed and Sealed this

Twenty-fifth Day of January, 1994

Attest:

BRUCE LEHMAN

*Attesting Officer*      *Commissioner of Patents and Trademarks*